(12) United States Patent
Klaiber et al.

(10) Patent No.: US 8,087,692 B2
(45) Date of Patent: Jan. 3, 2012

(54) AIRBAG FOR A MOTOR VEHICLE

(75) Inventors: Uwe Klaiber, Heidenheim (DE);
Michael Knoblauch, Erbach (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/312,682

(22) PCT Filed: Nov. 7, 2007

(86) PCT No.: PCT/EP2007/062012
§ 371 (c)(1),
(2), (4) Date: Sep. 11, 2009

(87) PCT Pub. No.: WO2008/061888
PCT Pub. Date: May 29, 2008

(65) Prior Publication Data
US 2010/0045008 A1      Feb. 25, 2010

(30) Foreign Application Priority Data
Nov. 22, 2006  (DE) ..................... 20 2006 017 996 U

(51) Int. Cl.
*B60R 21/276* (2006.01)
(52) U.S. Cl. ...................... 280/739; 280/743.1; 280/742
(58) Field of Classification Search .................. 280/739, 280/743.1, 742
See application file for complete search history.

(56) References Cited

U.S. PATENT DOCUMENTS

| | | | |
|---|---|---|---|
| 5,333,903 A | 8/1994 | Eyrainer et al. | |
| 5,454,595 A | 10/1995 | Olson et al. | |
| 5,603,526 A | 2/1997 | Buchanan | |
| 5,871,231 A | 2/1999 | Richards et al. | |
| 6,017,058 A | 1/2000 | Ross | |
| 6,095,557 A * | 8/2000 | Takimoto et al. | 280/739 |
| 6,428,042 B1 * | 8/2002 | Fischer et al. | 280/739 |
| 6,447,006 B1 | 9/2002 | Hess et al. | |

(Continued)

FOREIGN PATENT DOCUMENTS

DE    25 18 477 A1    11/1976

(Continued)

OTHER PUBLICATIONS

European Search Report mailing date of Nov. 25, 2009 for European Patent Application No. 07 822 322.9 (5 pgs).

*Primary Examiner* — Drew Brown
(74) *Attorney, Agent, or Firm* — Foley & Lardner LLP

(57) ABSTRACT

An airbag for a motor vehicle is provided The airbag comprising an airbag covering, two covering sections of the airbag covering facing each other, a discharge opening formed in one of the two covering sections for discharging gas out of the airbag, a connecting means for forming a releasable connection between the two covering sections, wherein upon inflation of the airbag the connection counters an escape of gas through the connecting means, and wherein upon inflation of the airbag the connecting means interacts with the airbag covering in such a manner that the connection is released and can escape out of the discharge opening. The two covering sections each form an airbag layer which are connected to each other for forming the airbag covering and which upon inflation of the airbag move away from each other. The airbag layers moving away from each other introduce a force into the connecting means such that the connections between the two covering sections is released.

19 Claims, 13 Drawing Sheets

U.S. PATENT DOCUMENTS

| | | | |
|---|---|---|---|
| 6,554,316 B2 * | 4/2003 | Schneider et al. | 280/743.1 |
| 6,832,778 B2 * | 12/2004 | Pinsenschaum et al. | 280/739 |
| 7,845,680 B2 * | 12/2010 | Abe et al. | 280/739 |
| 2002/0089158 A1 | 7/2002 | Fischer et al. | |
| 2005/0184493 A1 | 8/2005 | Hofmann et al. | |
| 2007/0045997 A1 * | 3/2007 | Abe et al. | 280/729 |
| 2007/0057492 A1 | 3/2007 | Feller et al. | |
| 2009/0039630 A1 * | 2/2009 | Schneider et al. | 280/740 |

FOREIGN PATENT DOCUMENTS

| | | |
|---|---|---|
| DE | 29 44 319 A1 | 5/1981 |
| DE | 41 01 286 A1 | 7/1992 |
| DE | 298 02 436 U1 | 7/1998 |
| DE | 101 61 956 A1 | 8/2002 |
| DE | 102 23 189 A1 | 12/2003 |
| DE | 10 2004 004 544 A1 | 8/2005 |
| EP | 0 495 409 A1 | 7/1992 |
| EP | 0 670 247 BI | 9/1995 |
| EP | 0 785 106 A1 | 7/1997 |
| EP | 0 800 959 A2 | 10/1997 |
| EP | 1 024 060 A1 | 8/2000 |
| EP | 1 568 544 A1 | 8/2005 |
| JP | 7-205738 A | 8/1995 |
| JP | 9-118186 A | 5/1997 |
| JP | 9-249085 A | 9/1997 |
| JP | 2005-199987 A | 7/2005 |
| WO | WO 97/46425 A1 | 12/1997 |
| WO | WO 2006/024472 A1 | 8/2005 |

* cited by examiner

AIRBAG FOR A MOTOR VEHICLE

CROSS-REFERENCE TO RELATED PATENT APPLICATIONS

This application is a National Phase Patent Application of International Patent Application Number PCT/EP2007/062012, filed on Nov. 7, 2007, which was published in German on May 29, 2008. The foregoing International Application is incorporated herein by reference in its entirety.

BACKGROUND

The invention relates to an airbag for a motor vehicle.

Such known airbags comprise an airbag covering that can be filled with gas in order to protect a person and that comprises two covering sections that face each other prior to inflation of the airbag. In order to discharge gas out of the airbag covering during or after inflation of the airbag a discharge opening is provided at one of the two covering sections as well as a connecting means for forming a releasable connection between the two covering sections which upon inflation suppresses an escape of gas through the discharge opening, wherein the connecting means interacts with the airbag covering upon inflation in such a manner that the connection is released and gas can escape out of the discharge opening.

SUMMARY

The problem underlying the invention is to improve an airbag of the afore-mentioned kind with respect to the opening of discharging openings during the inflation procedure.

According to an exemplary embodiment of the invention it is provided that the two covering sections each form a separate airbag layer which are connected to each other for forming the airbag covering and which are moving away from each other upon inflation of the airbag, and that the airbag layers moving away from each other introduce a force into the connecting means that causes releasing of the connection between the airbag layers.

By means of the provision to releasably connect the two airbag layers of an airbag covering by means of the connecting means, the discharging of gas out of the airbag (point in time of the opening of the discharge opening) is advantageously controllable by means of the relative position of the releasable connection with respect to the two airbag layers. Furthermore, the point in time of the opening of the discharging opening (point in time of the releasing or as the case may be destroying of the connecting means) is controllable via the rigidity of the connecting means itself. In case of a connecting means in the form of a tear seam for instance, this rigidity is determined by the length of the tear seam, the seam material, as well as the cross section of the seam material.

In case the releasable connection is arranged between the airbag layers of the airbag covering, for instance in an area of the airbag covering that is deployed early during inflation of the airbag, a corresponding early opening of the discharging opening can be effected, since the connection is released correspondingly early due to airbag layer parts moving apart from each other.

In case the releasable connection between the airbag layers lies however in an area of the airbag covering that upon inflation of the airbag deploys late, the discharging opening opens relatively late compared to the afore-mentioned position of the releasable connection between the two airbag layers, whereby a fast and efficient positioning of the airbag or rather the airbag covering is effected.

It is however also possible to connect more than two covering sections or airbag layers of the airbag covering facing each other by means of the connecting means, particularly in the form of a tear seam. For instance there exists the possibility to multiply fold an airbag layer so as to obtain a plurality of covering sections of the airbag covering that face each other or that are arranged successively, which are connected by means of the connecting means (e.g. tear seam).

Exemplary, the releasable connection between the two airbag layers formed by the connecting means extends—related to an evenly outspread state of the two airbag layers—at least in sections along the discharging opening, wherein the connection, starting from an outer edge of the airbag covering, extends at least in sections along the discharging opening.

In an exemplary variant of the invention, the connecting means fixes both of the airbag layers to one another in such a manner that the two airbag layers at least form a first chamber and an adjoining second chamber of the airbag covering. Thereby, for inflation of the airbag, the airbag is preferentially designed to be filled with gas via the first chamber, wherein the discharging opening is formed at the second chamber.

Exemplary, the first chamber comprises a volume that is larger than the volume of the second chamber. By means of the volume of the first chamber in relation to the volume of the second chamber the point in time of the releasing of the connection or the opening of the discharging opening is controllable as well. The larger the volume of the first chamber in relation to the second chamber, the longer it takes until by means of filling the first chamber a sufficient force can be introduced into the connecting means that releases the two airbag layers so that the second chamber at which the discharging opening is formed is opened.

In an exemplary embodiment of the invention it is provided that the releasable connection formed by the connecting means comprises a discontinuation, so that upon inflation gas from the first chamber can arrive into the second chamber already prior to releasing of the connection and from there can escape through the discharging opening out of the airbag. At the same time, the connecting means is preferably formed such that after a releasing of the connection, an amount of gas escapes per unit time out of the discharging opening during inflation that is significantly larger than prior to the releasing of the connection.

In an alternative exemplary embodiment, it is provided that the releasable connection between the airbag layers formed by the connecting means separates the first chamber from the second chamber in a manner such that prior to the releasing of the connection no gas from the first chamber can arrive into the second chamber and thus escape out of the discharging opening.

Exemplary, both of the two airbag layers of the airbag covering are connected to each other via their outer circumferential edges, wherein the second chamber preferentially comprises a section of the outer edge of the first and the second airbag layer, respectively. The airbag layers preferentially consist of a fabric, interlaced yarns or a film-like area-measured material and are preferentially sewn, glued or welded together.

The connecting means for forming the releasable connection between the airbag layers of the airbag covering comprises at least two material regions that are releasably connected to each other, which are designed to be separated from each other by means of introduction of a pre-definable force that pretensions the two material regions in opposite directions so that the connection is released, or as the case may be, so that the second chamber is disintegrated.

Particularly, such material regions can be sections of a tear seam or a bond (e.g. silicone) that are integrally formed. Prior to inflation of the airbag, such a tear seam on one hand connects the opposing airbag layers and, as the case may be, a covering element for covering the discharging opening to the first airbag layer, so that upon inflation of the airbag—in this respect both airbag layers are being pushed apart—a force is introduced into the tear seam that causes a tearing of the tear seam, i.e., a separation of two sections of the tear seam connected to each other (material regions), so that the connection of the airbag layers is released.

Exemplary, the at least one tear seam circulates—related to an evenly outspread state of the two airbag layers—the discharging opening at least partially, wherein the at least one tear seam preferably extends with each of its free end portions to the outer edge of the airbag covering that is formed by the circumferential edges of the two airbag layers lying on top of each other.

In an exemplary alternative embodiment of the invention, it is provided that the connecting means is formed by two tear seams running at an acute angle with respect to each other, each extending from the outer edge of the airbag covering. In this respect, the two tear seams can cross each other, so that the second chamber that is formed by connecting the two airbag layers by means of the tear seams, is completely separated from the first chamber. Alternatively, the two tear seams can extend in such a manner with respect to each other that a gap between end portions of the tear seams facing each other are formed, through which, already prior to the releasing of the connection provided by the tear seams, gas from the first chamber can arrive into the second chamber and therefore can escape through the discharging opening out of the airbag.

In a further exemplary variant of the invention, the connecting means is formed by two tear seams extending from the outer edge of the airbag covering and a tear seam that extends across these two tear seams. Also in this case, the tear seam running across can cross one or both of the other two tear seams, so as to provide a chamber that is gas-tight prior to the releasing of the connection, or a second chamber that is connected with the first chamber in a gas conducting manner.

Exemplary, the discharging opening formed at the second chamber is formed at the first airbag layer.

In an exemplary embodiment of the invention, a covering element for covering the discharging opening is provided. A complete gas impermeability of the discharging opening closed by means of the covering element or of the covered discharging opening is not mandatory. In fact it is rather crucial that in an opened state of the discharging opening an amount of gas escapes out of the airbag that is larger by a multiple as in case of a closed discharging opening.

Exemplary, the connecting means also effects a releasable connection between the covering element and the airbag layer in such a manner that the covering element butts against the discharging opening, wherein the connecting means is adapted and provided to set free the covering element upon inflation of the airbag for opening the discharging opening by releasing said releasable connection, so that gas can escape out of the discharging opening. I.e., the connecting means connects the two airbag layers to one another—as the case may be under formation of a chamber comprising the discharging opening—as well as the covering element to the first airbag layer, so that the releasable connection between the connecting element and the first airbag layer is released when the two airbag layers moving away from each other upon inflation introduce a pre-definable force into the connecting means.

Exemplary, the covering element covers the discharging opening from an exterior space surrounding the airbag covering, so that the covering element, when it is pressurized with gas upon inflation of the airbag that flows from the interior space against the covering element, is lifted off from the discharging opening, so far it is not suitably attached to an edge area of the discharging opening or to the first airbag layer in which the discharging opening is formed.

In an exemplary variant of the invention, it is provided that the covering element is permanently connected to the first airbag layer via a further connecting means, e.g. a seam, and is additionally attached to the first airbag layer via the releasable connecting means (e.g. a tear seam), so that after a releasing of the releasable connection between the two airbag layers provided by the connecting means (tear seam) it is merely pushed away from the discharging opening and furthermore covers the discharging opening.

Or in other words, after the connection between the two airbag layers is released, the covering element is displaced from a first position, in which the covering element closes the discharging opening, by means of pressurizing the covering element with gas, into a second position, in which the covering element is arranged with respect to the discharging opening in such a manner, that gas can flow through the discharging opening out of the airbag covering into an exterior space surrounding the airbag covering.

Thereby, in the first position, the covering element preferably tightly butts with a first area against an edge area of the discharge opening limiting the discharge opening. Hereby, the discharge opening is sufficiently closed, so that at the most minor amounts of gas may escape out of the airbag covering through the discharge opening closed in this way.

In the second position however, the covering element is preferentially curved away from the discharging opening such that the first area of the covering element due to the bulge of the covering element is arranged at a distance from the discharging opening in the exterior space in front of the discharging opening.

In order that the covering element tightly butting against the edge area of the discharging opening forms in its second position the afore-mentioned bulge, it comprises in its first position at least one crease that divides the covering element into the first area and a second area connected to the first area. Thereby, in the first position of the covering element, the crease is fixed at the first airbag layer by means of the connecting means such that the first area of the covering element tightly butts against the edge area of the discharging opening, and the second area of the covering element is arranged in between the first area of the covering element and the first airbag layer as an intermediate layer.

When the covering element (after the releasing of the connecting means) upon inflation of the airbag is pressurized with gas as described above, the first area of the covering element is lifted off from the edge area of the discharging opening, wherein the covering element obtains its afore-mentioned bulge under unfolding of its crease. By means of this crease, a material supply of the covering element is provided that is necessary for forming the bulge. Of course, several creases may be provided at the covering element.

The covering element comprises an outer, circumferential edge via which it is permanently (firmly) connected by means of a connection, particularly a seam, to the first airbag layer. Thereby, the connection is in sections interrupted such that the covering element and the first airbag layer each form an edge area of an opening formed between the covering element and the first airbag layer through which—in case of a released connecting means—gas leaking out of the discharging opening can escape into the exterior space of the airbag covering. In the first position of the covering element however, the two edge sections butt against each other.

In an exemplary embodiment of the invention, the covering element is formed triangle-shaped. Thereby, the covering element comprises two mutually adjoining longitudinally extending outer edges via which the covering element is preferentially attached to the first airbag layer. The two edges preferentially enclose a right angle. A remaining third, longitudinally extending edge or edge area connecting the two mutually adjoining edges of the covering element is however not connected to the first airbag layer so that the afore-mentioned opening between the covering element and the first airbag layer is formed. The crease the covering element comprises in the first position thereby preferentially extends along one of the two edges adjoining each other, and preferentially runs parallel with respect to said edge, wherein said crease extends up to those edge area of the covering element that limits the afore-mentioned opening.

In an alternative exemplary variant of the invention, the covering element is formed stripe-shaped, wherein the covering element is in this case preferentially attached to the first airbag layer via two edges facing each other. Correspondingly, the stripe-shape covering element forms together with the first airbag layer two openings facing each other that are each limited by an edge area of the covering element and an opposing area of the first airbag layer. Said crease thereby runs along one of the two edges facing each other via which the stripe-shaped covering element is attached to the first airbag layer.

Exemplary, at least one tear seam is sewn over the entire covering layer, wherein the tear seam pierces the airbag layers lying on top of each other prior to inflation, i.e. the two airbag layers of the airbag covering as well as the covering element.

Exemplary, the tear seam thereby also connects the first area of the covering element to the second area of the covering element, in order to fix the spatial position of the at least one crease of the covering element.

Exemplary, the covering element is formed as a flexible covering layer that is particularly made of an airbag fabric that can be identical to a fabric used for the airbag covering.

In an exemplary embodiment of the invention, discharging openings for discharging gas out of the airbag covering are also provided at the second airbag layer. Such discharging openings preferentially congruentially face—related to an evenly outspread state of the two airbag layers—discharging openings formed at the first airbag layer. In case that several discharging openings are provided at the first airbag layer, they are, as the case may be, formed at the second chamber and are, as the case may be, covered by the covering element as well.

Exemplary, the first airbag layer forms an impact surface for a person to be protected, into which the person dives in a retention case. Preferentially, the airbag is designed as a driver airbag, a co-driver airbag, or a side airbag.

BRIEF DESCRIPTION OF THE DRAWINGS

The described features and advantages of the invention shall be clarified by means of the following descriptions of figures of embodiments of the invention.

DETAILED DESCRIPTION

Figure 1:
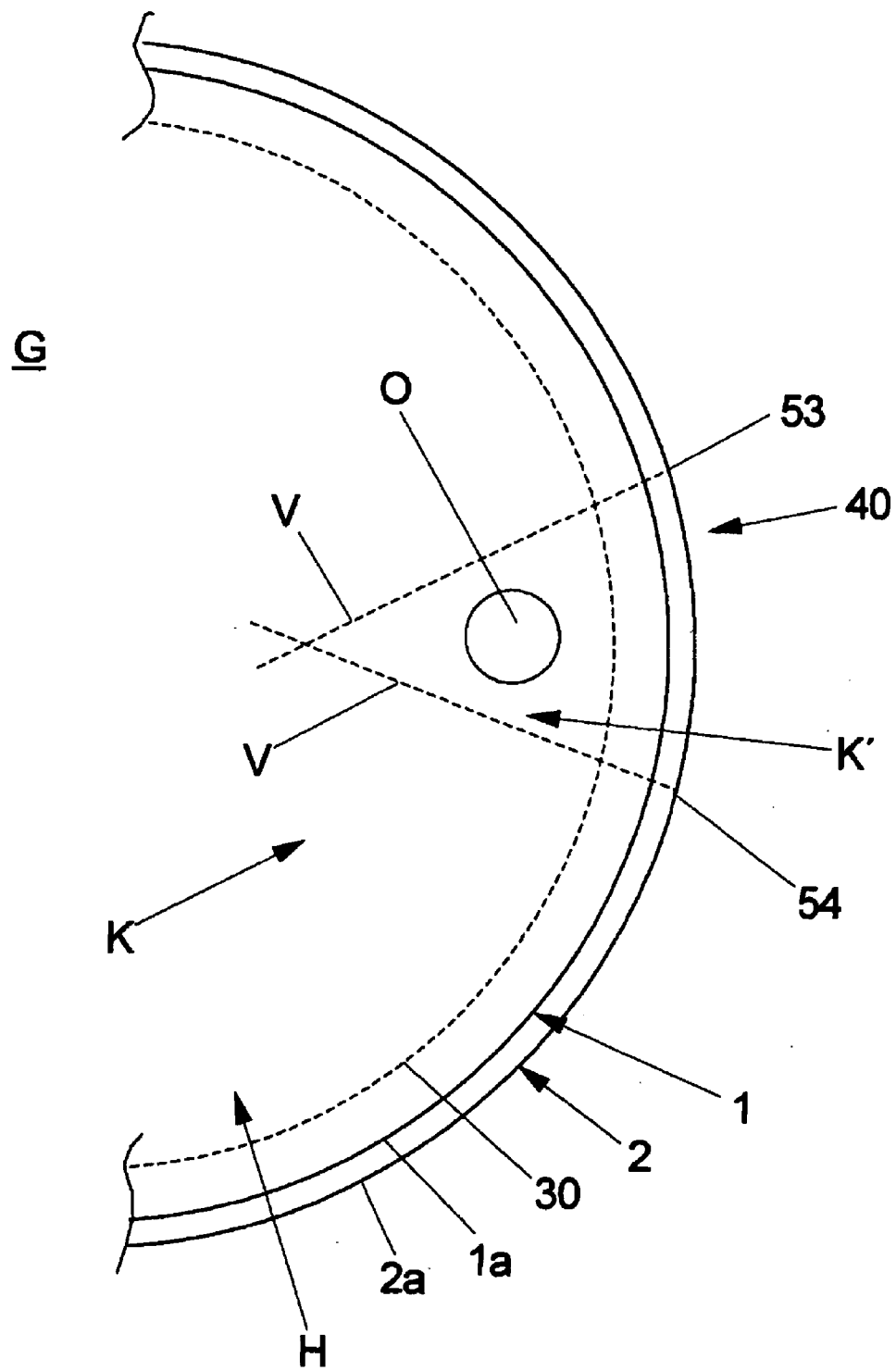
FIG. 1 shows a schematic, fragmentary plan view onto an evenly outspread airbag having a discharging area that is closed by means of tear seams.

FIG. 1 shows an airbag G evenly spread out in a plane having a first airbag layer 1 and a second airbag layer 2 each comprising an outer, circumferential edge 1a, 2a via which the two airbag layers 1, 2 are connected to each other, preferentially via a seam 30 that extends along the outer circumferential edges 1a, 2a of the two airbag layers 1, 2. The two airbag layers 1, 2 thus form an airbag covering H of the airbag G that can be filled with gas. In FIG. 1 the second airbag layer 2 is covered by the first airbag layer 1.

The airbag covering H can be filled with gas by means of a gas generator that is not shown. For this, the gas generator can be arranged in an interior space of the airbag G surrounded by the airbag covering H, so that gas set free by the gas generator directly ends up in the airbag covering H. Furthermore, the gas generator can be connected to an inflow opening of the airbag covering H via a suitable conduit. Further, the gas generator can project through an inflow opening of the airbag covering H into the interior space of the airbag covering H. Preferably, the airbag G consists of a flexible airbag fabric, but can also be made out of a film-like area-measured material.

The airbag covering H comprises a discharging opening O formed at the first airbag layer 1 through which—in an opened state—gas can escape out of the airbag covering H. Hereby, the energy absorption behavior of the airbag G in case a person to be protected dives into the inflated airbag G is improved.

The airbag covering H is divided into a first chamber K and a smaller second chamber K' by means of two tear seams V connecting the two airbag layers 1, 2 to each other, which tear seams V—in an evenly outspread state of the airbag covering H—each extend with an end portion 53, 54 from an outer edge 40 of the airbag covering H formed by the two edges 1a, 2a and enclose an acute angle, wherein the discharging opening O is formed at the second chamber K'.

For inflation of the airbag G gas is set free into an interior space of the airbag covering H surrounded by the first chamber K. Due to the gas pressure resulting hereby in the first chamber K, the first and the second airbag layer 1, 2 are pushed apart, wherein a force is introduced into the tear seams V that finally destroys the tear seams V. Hereby, the separation between the first and the second chambers K, K' formed by the tear seams V is unmade and gas set free in the first chamber K can escape from the airbag covering H through the discharging opening O.

Figure 2:
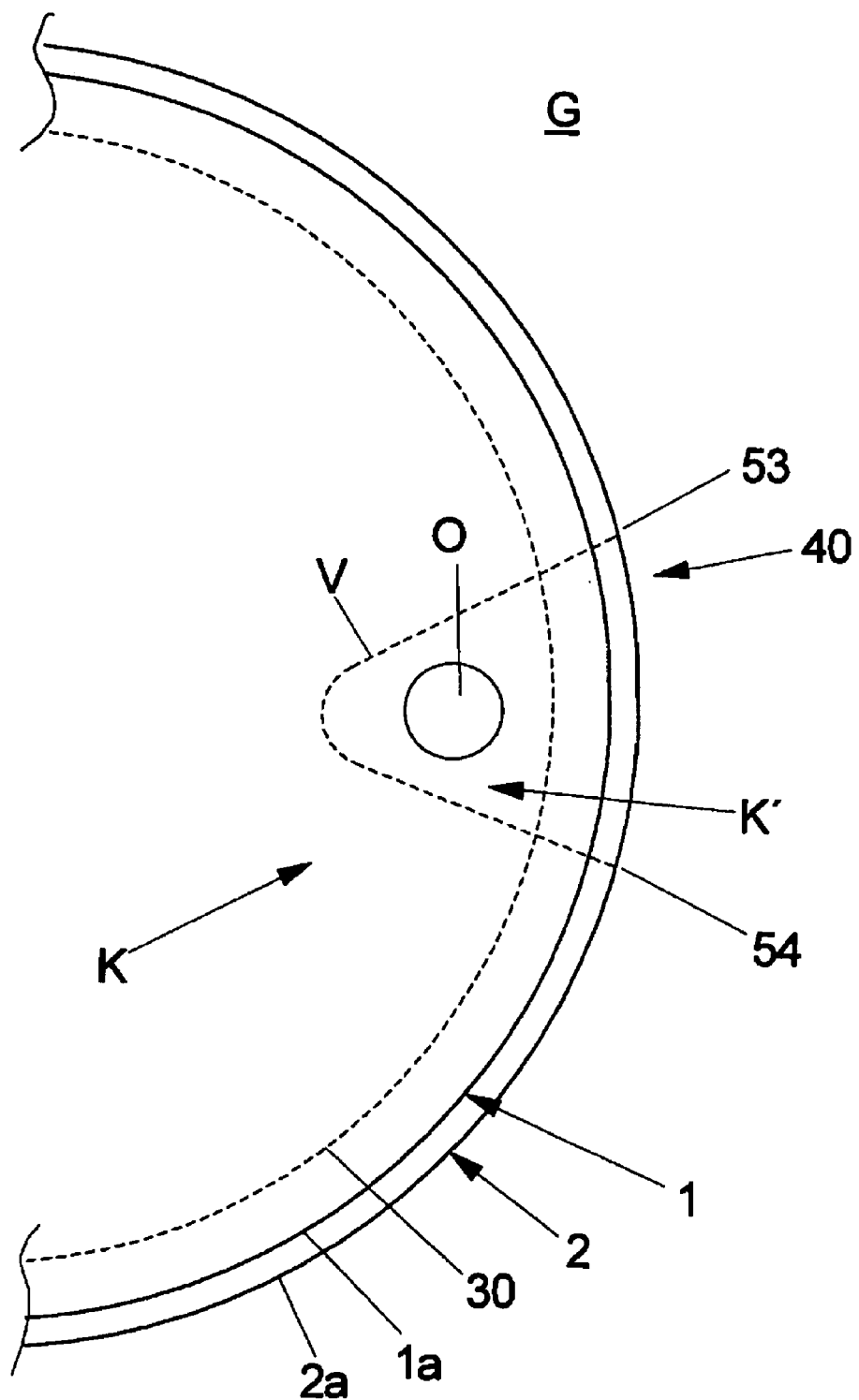
FIG. 2 shows a schematic, fragmentary plan view onto a modification of the airbag shown in FIG. 1.

FIG. 2 shows a modification of the airbag G shown in FIG. 1, in case of which, as a difference to FIG. 1, the chamber K' comprising the discharging opening O is separated from the adjoining first chamber K by means of a continuous tear seam V that extends with each of its end portions 53, 54 from an outer edge 40 of the—evenly spread out—airbag covering H and encompasses the discharging opening O.

Figure 3:
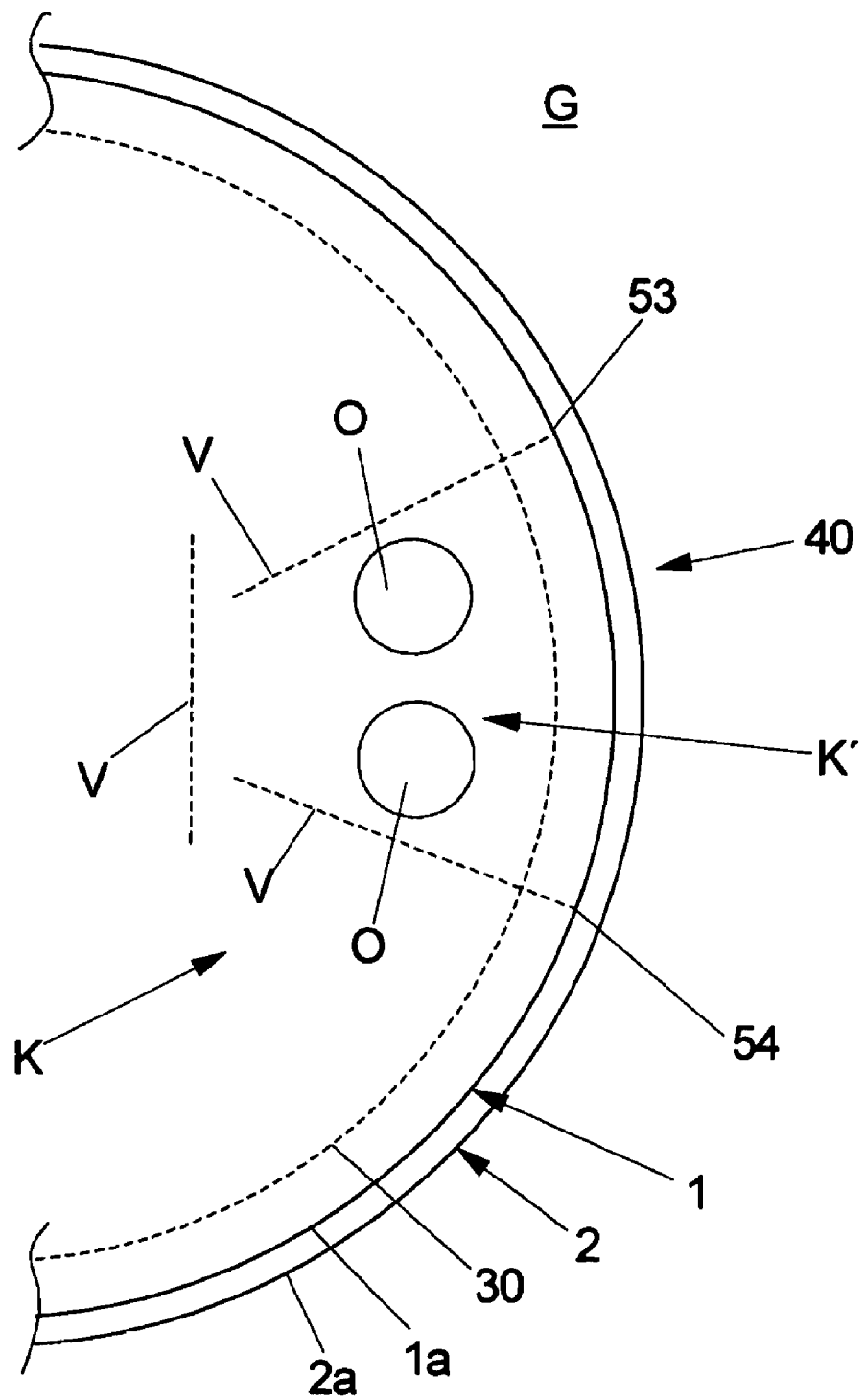
FIG. 3 shows a schematic, fragmentary plan view onto a further modification of the airbag shown in FIG. 1.

FIG. 3 shows a further modification of the evenly outspread airbag G shown in FIG. 1, in case of which, as a difference to FIG. 1, two adjacent discharging openings O formed at the first airbag layer 1 are provided. Furthermore, as a difference to FIG. 1, the second chamber K' is separated from the first chamber K by means of three tear seams V connecting the two airbag layers 1, 2 to each other, so that the two discharging openings O are formed at the second chamber K'. Thereby, two of the three tear seams V extend from the outer edge 40 of the airbag covering H and extend on both sides of the discharge openings O, so that the two discharge openings O are arranged between said tear seams V along the edge 40. A third tear seam V runs across the two tear seams that extend from the outer edge 40 in conjunction with FIG. 2, so that the two discharging openings O are arranged between the tear seam V that runs across and the edge 40.

The tear seam V running across is arranged at a distance with respect to the other two tear seams V, so that the two chambers K, K' are connected to each other in a gas conducting manner already prior to the tearing of the tear seams V, i.e., gas set free in the first chamber K can leak through the tear seams V into the second chamber K'. From there, the gas flowing into the second chamber K' upon inflation of the airbag G escapes through the discharge openings O out of the airbag covering H.

After a releasing of the connection between the two airbag layers 1, 2, i.e., after a tearing of the tear seams V, the second chamber K' does no longer exist and gas can escape in a significantly larger amount through the discharging openings O out of the airbag covering H.

Figure 4:
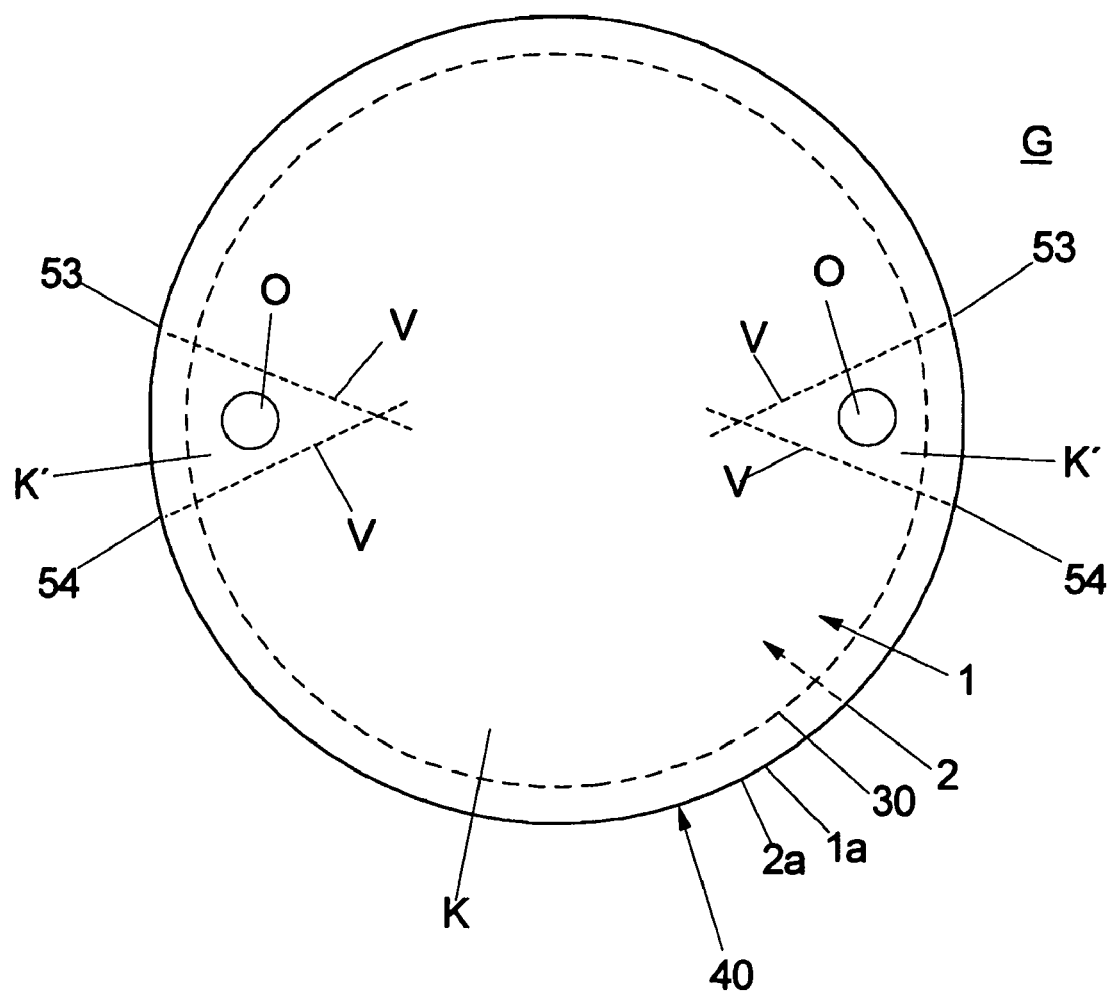
FIG. 4 shows a schematic plan view onto an airbag in the form of a driver airbag having two discharging openings of the kind shown in FIG. 1.
Figure 5:
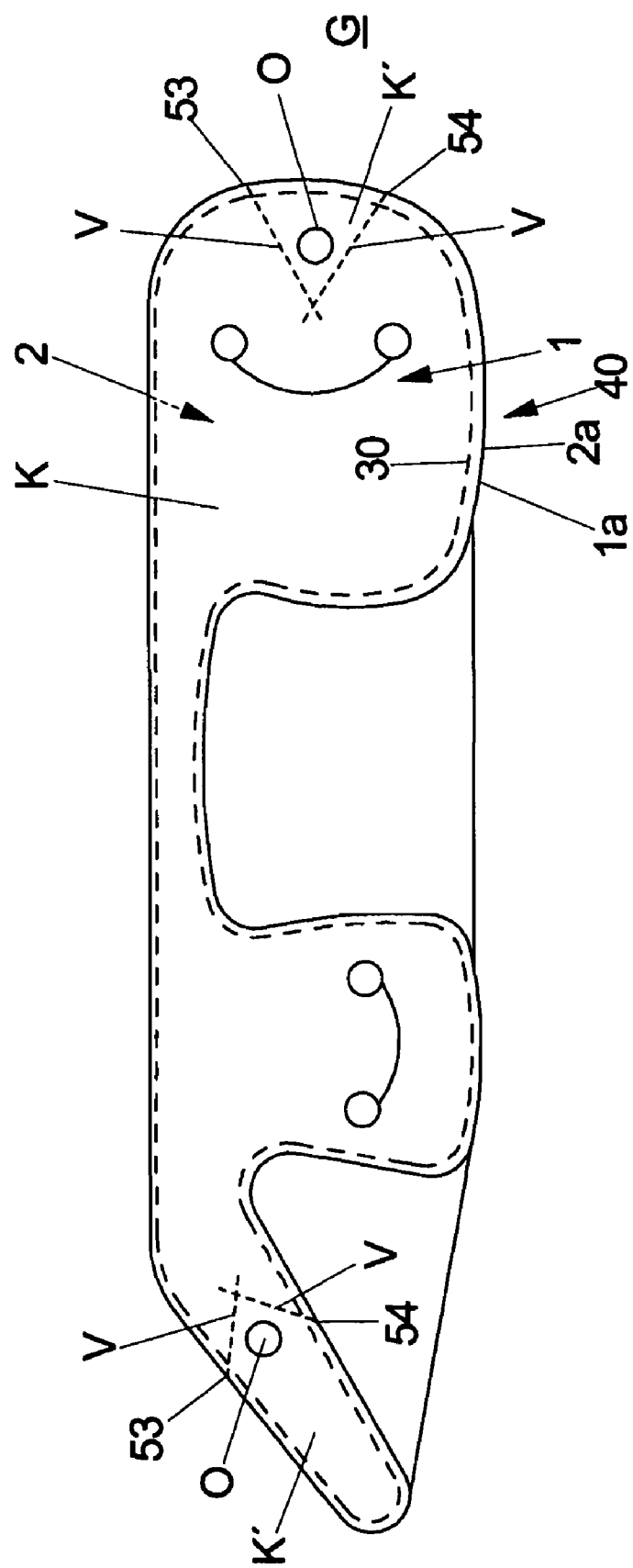
FIG. 5 shows a schematic plan view onto an airbag in the form of a head side airbag having to discharging openings of the kind shown in FIG. 1.
Figure 6:
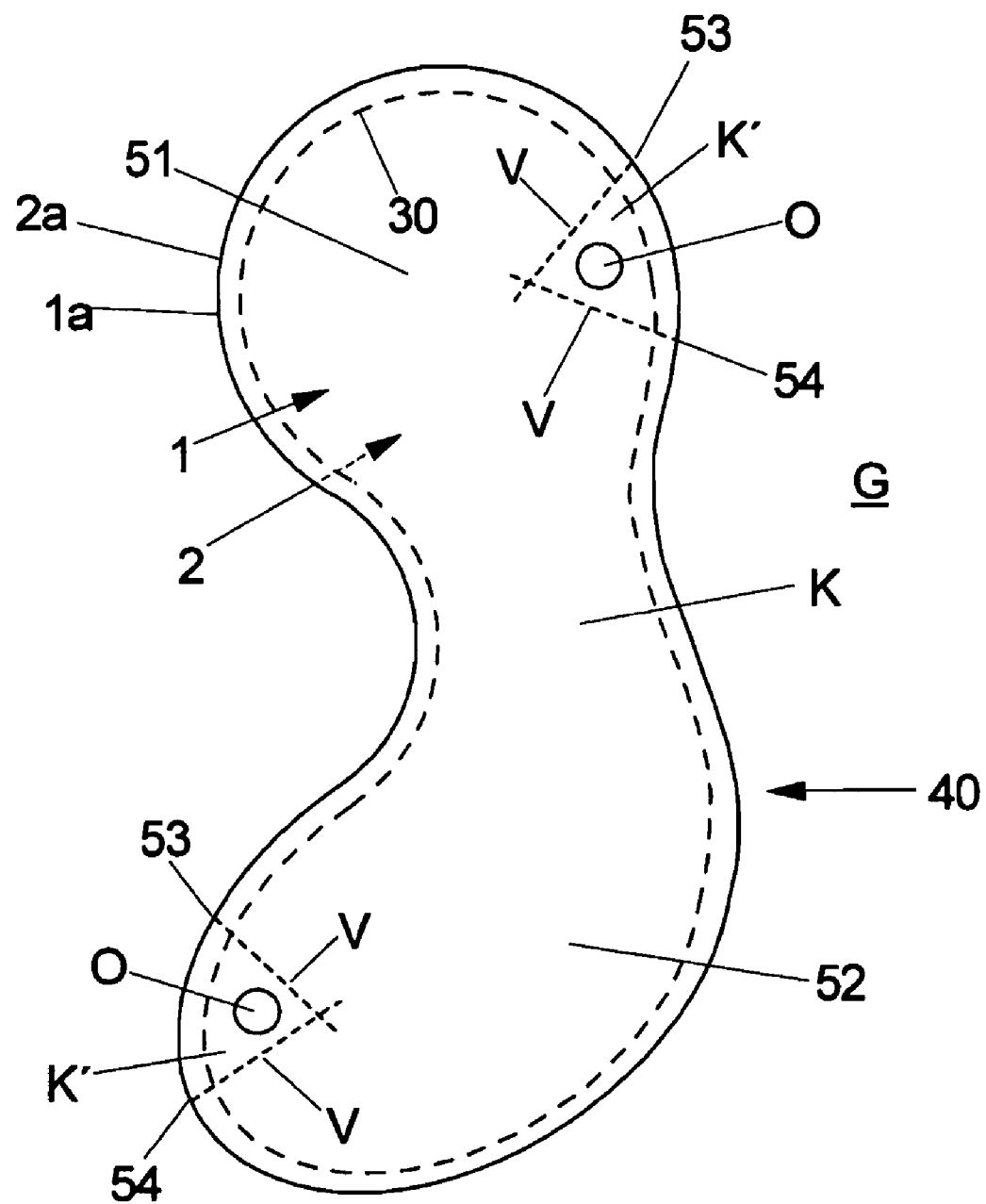
FIG. 6 shows a schematic plan view onto an airbag in the form of a head thorax side airbag having two discharging openings of the kind shown in FIG. 1.

The FIGS. 4 to 6 show discharge openings O of the kind shown in FIG. 1 in conjunction with different shapes of airbags. Such discharging openings O having the above-described mechanism for time controlled discharging of gas out of the airbag covering H can be advantageously employed in all airbags G that are formed out of two airbag layers 1, 2 connected along their circumferences.

FIG. 4 shows an airbag G in the form of a driver airbag in an evenly outspread state. The airbag G consists of a circular first airbag layer 1 and a second airbag layer 2 formed congruentially thereto, which airbag layers 1, 2 are connected to each other along their outer, circumferential edges 1a, 2a by means of a seam 30 so that an airbag covering H that can be filled with gas is formed. The second airbag layer 2 is covered by the first airbag layer 1 in FIG. 4.

At two opposing sections of the outer, circumferential edge 40 of the airbag covering H, a discharging opening O is formed in the first airbag layer 1, respectively, that in a deployed and built-into-a-vehicle state of the airbag G faces away from a driver that is to be protected, so that the driver is not directly hit by hot gases that are discharged out of the discharging opening O.

For the controlled time-controlled opening of the two discharging openings O the latter are provided in second chambers K' of the kind shown in FIG. 1 that are mirror-symmetrically arranged at the airbag cover H.

FIG. 5 shows a head side airbag G that is adapted and provided to extend from the interior of a motor vehicle in front of the windows of a lateral body of the motor vehicle in a deployed (inflated) state, i.e., between an A- and a C-pillar. In the deployed state, the airbag G comprises at an area running along the A-pillar a second chamber K' of the kind shown in FIG. 1 having a discharging opening O, as well as a further second chamber K' of the kind shown in FIG. 1 at a rearmost area of the airbag covering H of the airbag G extending adjacent to the C-pillar.

FIG. 6 finally shows a schematic plan view onto an airbag G in the form of a head thorax side airbag comprising a first airbag layer 1 and a second airbag layer 2 circumferentially connected to the first airbag layer 1 via a seam 30, which together form an airbag covering H of the airbag G that can be filled with gas. The airbag covering H comprises a head chamber 51 for protecting the head of an occupant and a thorax chamber 52 connected to the head chamber 51 that is adapted and provided for protecting the thorax area of the occupant.

The airbag G is designed for deploying out of a backrest of a motor vehicle seat, wherein the head chamber 51 is arranged along the vertical vehicle axis above the thorax chamber 52. Both chambers 51, 52 thereby extend along the vehicle transverse axis between a lateral motor vehicle body and an occupant that is to be protected. Here, the first airbag layer 1 faces the motor vehicle body. For controlled venting of the airbag G, the thorax chamber 52 comprises a discharging opening O that is formed in the first airbag layer 1 for protecting the occupant from hot gases, namely at the edge 40 of the airbag covering H. The discharging opening O is separated by means of tear seams V of the kind described in FIG. 1 from the airbag covering H, i.e., from the first chamber K.

Figure 7:
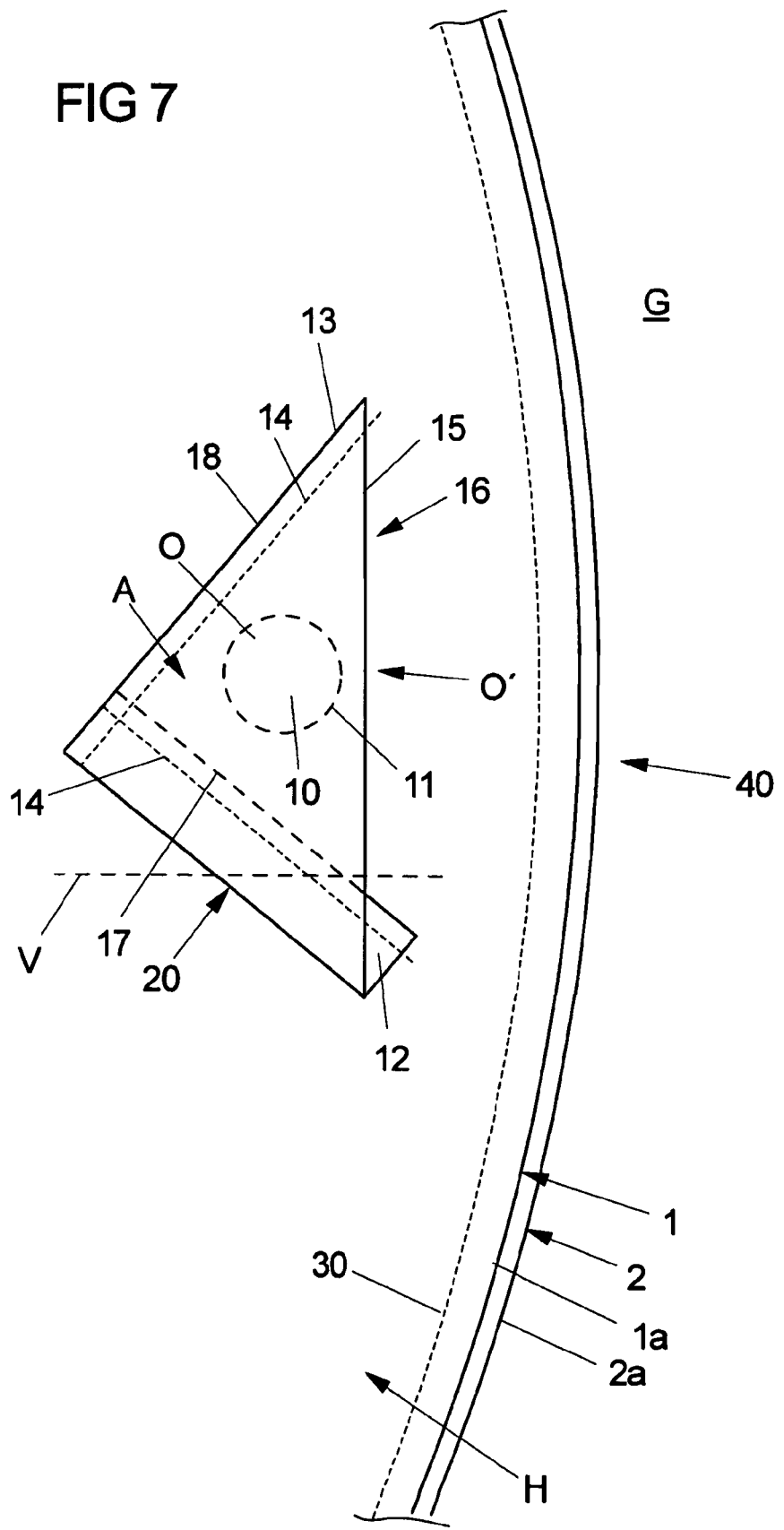
FIG. 7 shows a schematic, fragmentary plan view onto an evenly outspread airbag having a discharging opening that is covered by a covering element in the form of a covering layer.
Figure 8:
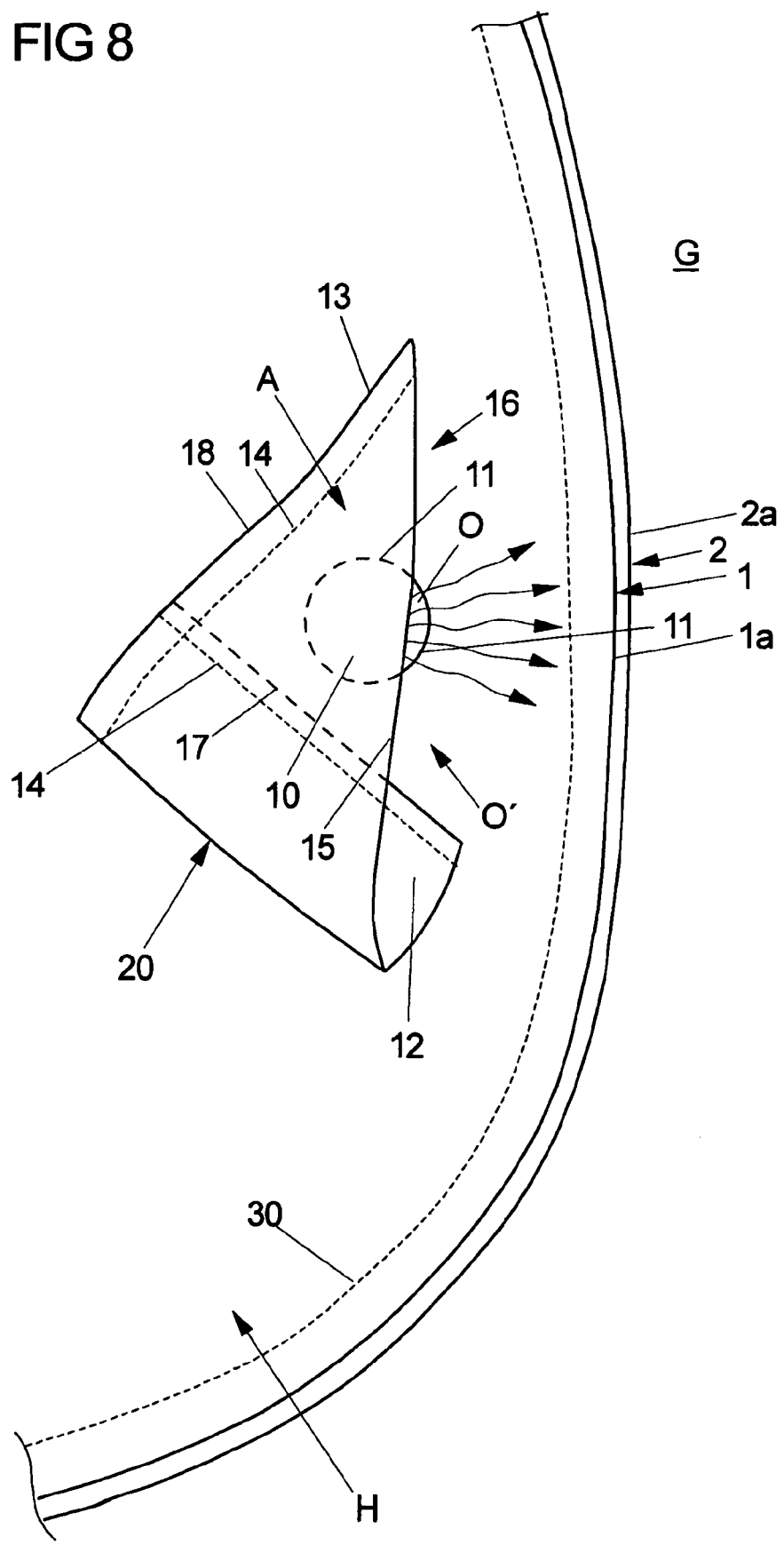
FIG. 8 shows a fragmentary, perspective view of the airbag shown in FIG. 1 having a curved covering element setting free the discharging opening.

FIG. 7 shows in conjunction with FIG. 8 a further embodiment in which case, as a difference to the FIGS. 1 to 6, no division of the airbag covering H into chambers by means of tear seams V is carried out. Furthermore, as a difference to FIGS. 1 to 6, a covering element A for covering a discharge opening O formed at the first airbag layer 1 is provided.

Related to the evenly outspread state of the airbag covering H shown in FIG. 7, the first airbag layer 1 of the airbag covering H faces the second airbag layer 2 of the airbag covering H across the plane of extension of the airbag covering H, which second airbag layer 2 is distanced from the first airbag layer 1 at least aside from the edge 40 upon inflation of the airbag G, namely due to an extension of the airbag covering H effected by the inflation.

The afore-described distance of the two opposing airbag layers 1, 2 is used at hand, as will be described in the following, for a controlled opening of the discharge opening O. For this, the discharging opening O is covered from an exterior space surrounding the airbag covering H by an essentially triangle-shaped covering element A in the form of a covering layer. Accordingly, the covering element A comprises two mutually adjoining longitudinally extending edges 17, 18 that preferentially run across with respect to each other and via which the covering element A is firmly connected to the first airbag layer 1 of the airbag covering H by means of a seam 14, respectively.

The covering element A further comprises an edge area 15 that connects the two edges 17, 18 to each other and that is not connected to the first airbag layer 1 of the airbag covering H, but limits an opening O' together with an opposing area 16 of the first airbag layer 1, so that gas residing in the interior space of the airbag covering H—as far as the covering element A does not sealably butt against the discharging opening O—flows through the discharging opening against the covering element A covering the discharging opening O and is redirected by said covering element A via the opening O' into the exterior space surrounding the airbag covering H.

In order that the covering element A covering the discharging opening O can be moved away from the discharging opening O, the covering element A comprises a crease running along the one edge 17 that divides the covering element A into a first area 10 and a second area 12 connected to the first area 10.

For closing the discharging opening O, the first area 10 sealably butts against an edge area 11 encircling the discharging opening O. In this respect, the first area 10 of the covering element A is folded onto the second area 12 of the covering element A, wherein the first area 10 of the covering element A tightly butts against the first airbag layer 1 of the airbag covering H comprising the discharging opening O, wherein the second area 12 extending along the discharging opening O forms an intermediate layer. In order to fix this first position of the covering element A the covering element A takes, prior to the inflation of the airbag G, a tear seam V is sewn over the covering layer A that on one hand connects the covering element A to the first airbag layer 1 and on the other hand connects the first airbag layer 1 to the second airbag layer 2. Furthermore, the tear seam V connects the first area 10 to the second area 12 of the covering element A, so that the crease 20, regarding its spatial position, is fixed with respect to the discharging opening O, namely in such a manner, that the first area 10 of the covering element A tightly butts against the edge area 11 limiting the discharging opening O, in order to close the discharging opening O.

When the airbag covering H is filled with gas, the two airbag layers 1, 2 of the airbag covering H are pushed apart, whereby a force is introduced into the tear seam V that destroys the tear seam V. As a consequence, the gas flow directed from the interior space of the airbag covering H towards the first area 10 of the covering element A causes that the first area 10 of the covering element A is pushed away from the edge area 11 of the discharging opening O, wherein the tightly abutting state is transferred into a curved state, due to the existence of the crease 20, that sets free the opening O' that is closed in the first position by means of the two edge areas 15, 16. Through this opening O' the gas flowing out of the discharging opening O can be directed into the exterior space of the airbag covering H.

By means of the firm spatial position of the two airbag layers 1, 2 with respect to each other effected by means of the connecting means V, the airbag covering H can be folded arbitrarily prior to inflation of the airbag G without essentially reducing the reproducibility of the opening of the discharging opening O. In the embodiment shown in FIGS. 7 and 8, the discharging opening O is formed close to the circumferential edge 1a of the first airbag layer 1. In case of a rotationally symmetrically driver airbag (cf. FIG. 4) where the gas generator is usually arranged centrally with respect to the two airbag layers 1, 2, this effects a relatively late opening of the discharging opening O, since the airbag covering H initially expands centrally and then towards the edges 1a, 2a.

Figure 9:
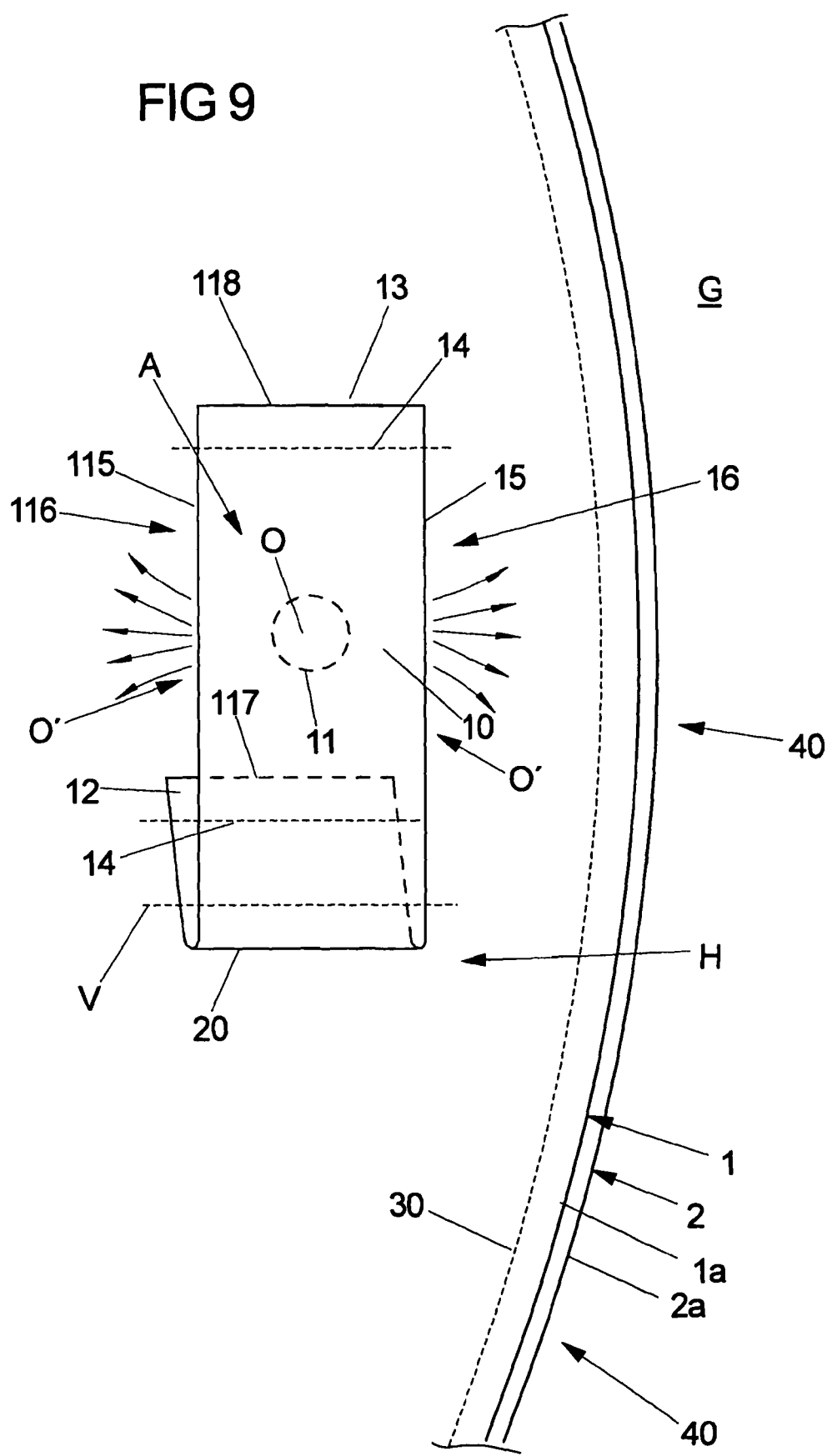
FIG. 9 shows a schematic, fragmentary plan view onto a modification of the airbag shown in FIG. 7 or 8.

FIG. 9 shows a modification of the covering layer A shown in FIGS. 7 and 8 that, as a difference to FIG. 7 or 8, is not designed triangle-shaped but stripe-shaped (rectangular-shaped). Thereby, the stripe-shaped covering layer A is connected on both sides of the discharging opening O to the first airbag layer 1 via two opposing edges 117, 118, so that the covering layer A forms two edge areas 15, 115 facing each other along the edges 117, 118, that in conjunction with edge areas 16, 116 opposing the edge areas 15, 115, limit two opposing openings O'. Gas leaving the discharging opening O can thus flow through the covering element A and the first airbag layer 1 along two opposing directions out of the two openings O'. The crease 20 as well as the tear seam V extend along one of the two edges 117, 118 of the covering layer A.

Figure 10:
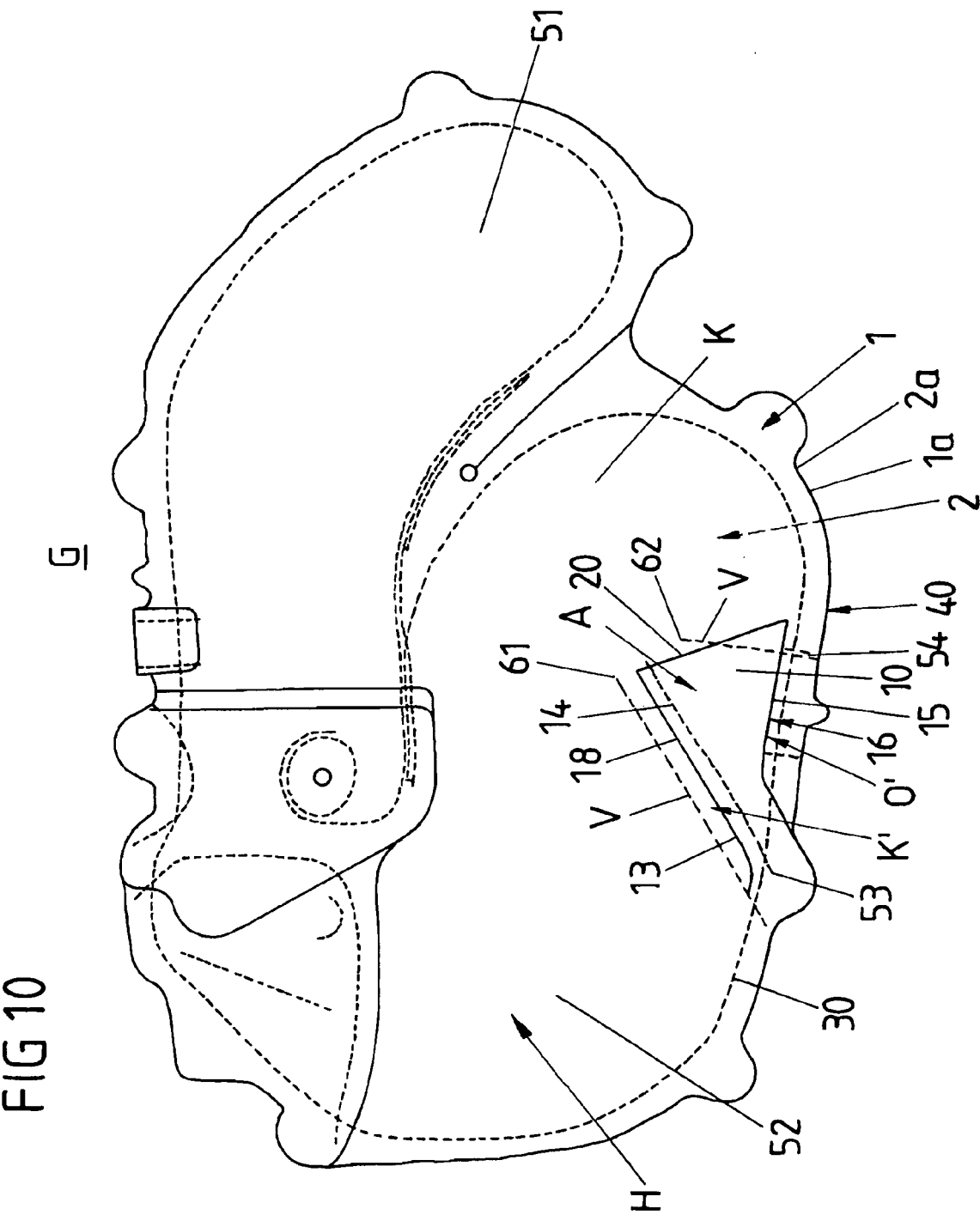
FIG. 10 shows a plan view onto a first airbag layer (impact side) of an evenly outspread airbag of the kind shown in FIG. 6 having discharging openings covered by a covering element that are formed at a chamber of the airbag covering, wherein the chamber is formed by areas of the airbag covering that are connected to each other by means of tear seams.
Figure 11:
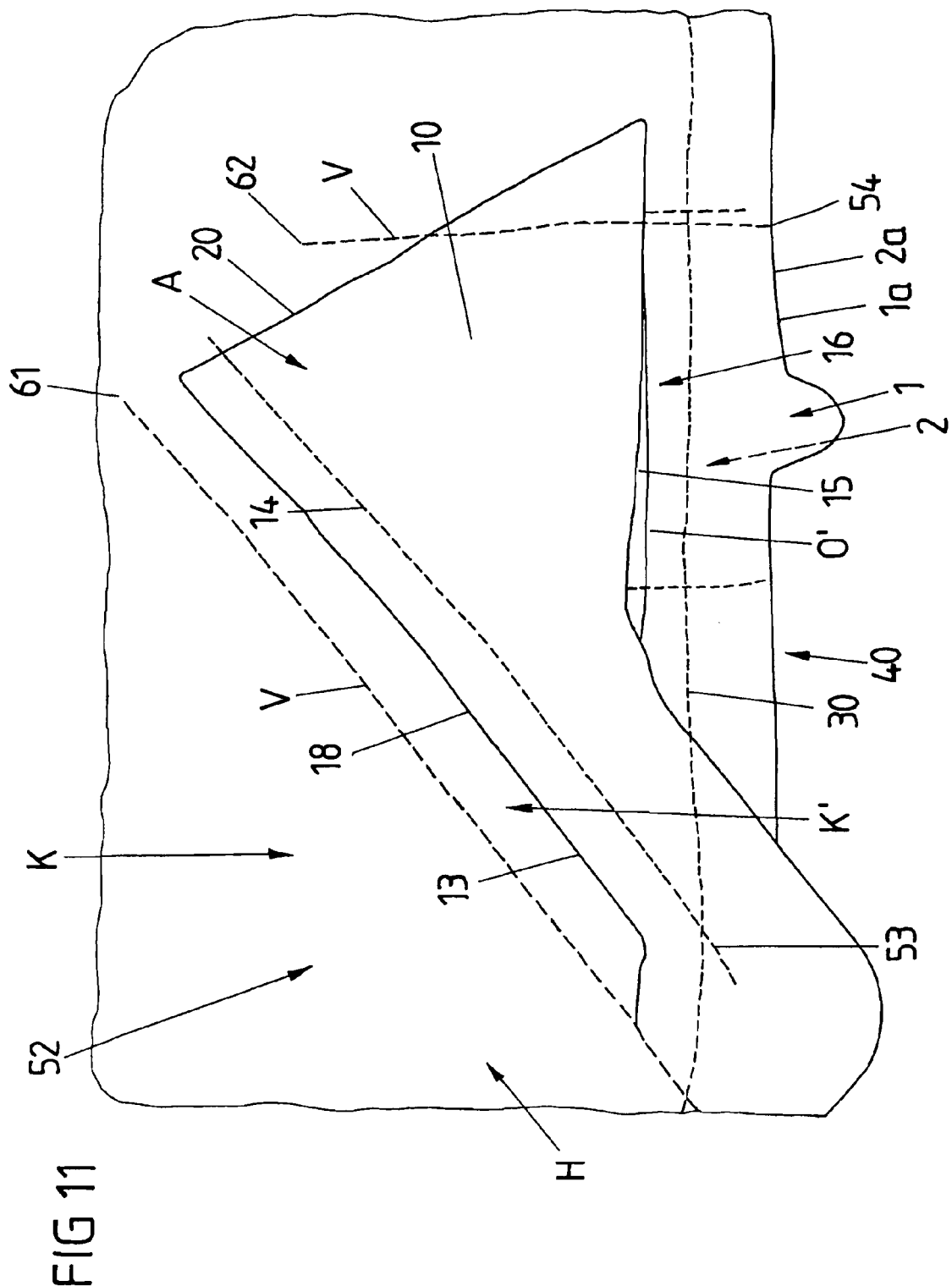
FIG. 11 shows a detail of the view shown in FIG. 10.
Figure 12:
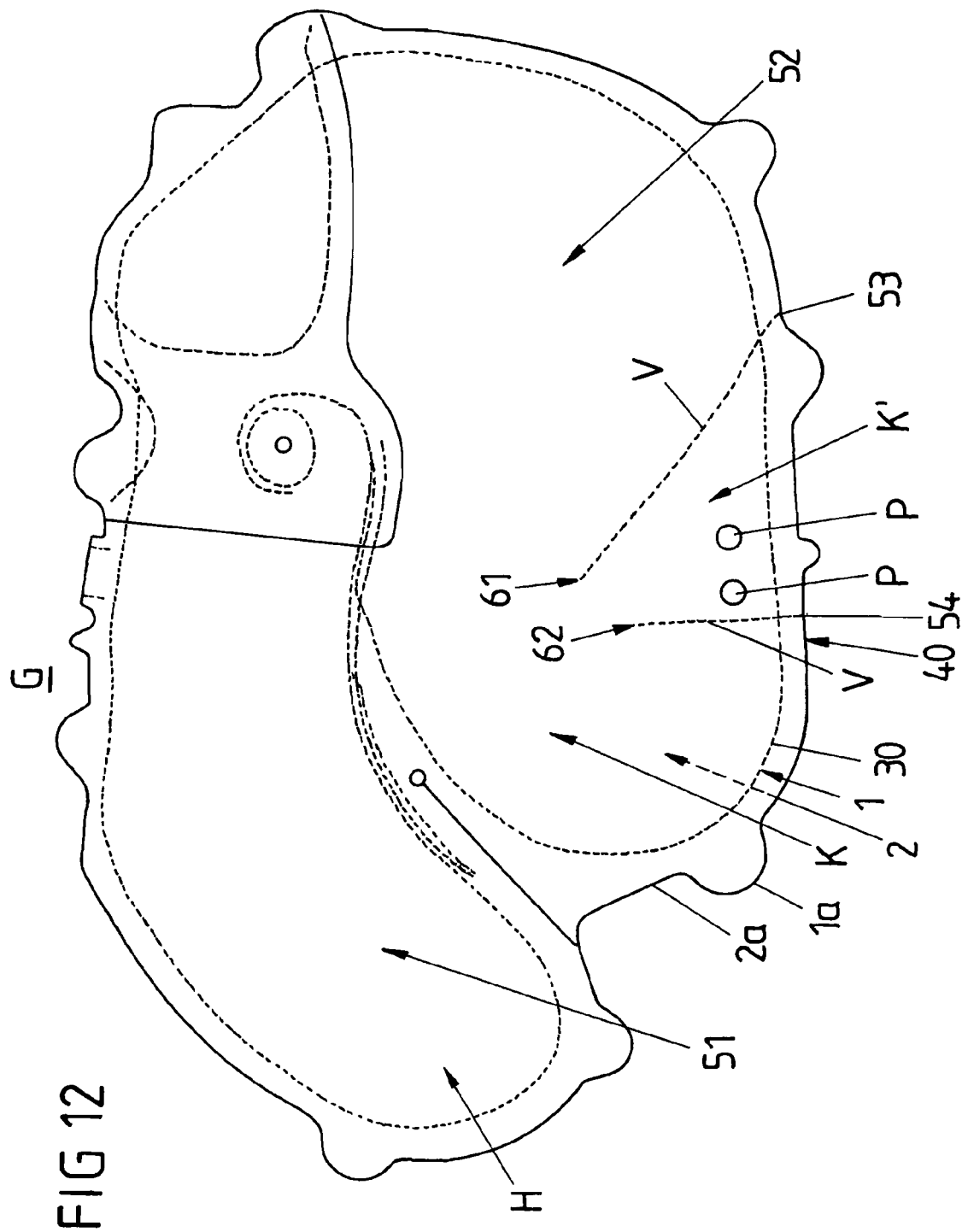
FIG. 12 shows a rear view of the airbag shown in FIG. 10.
Figure 13:
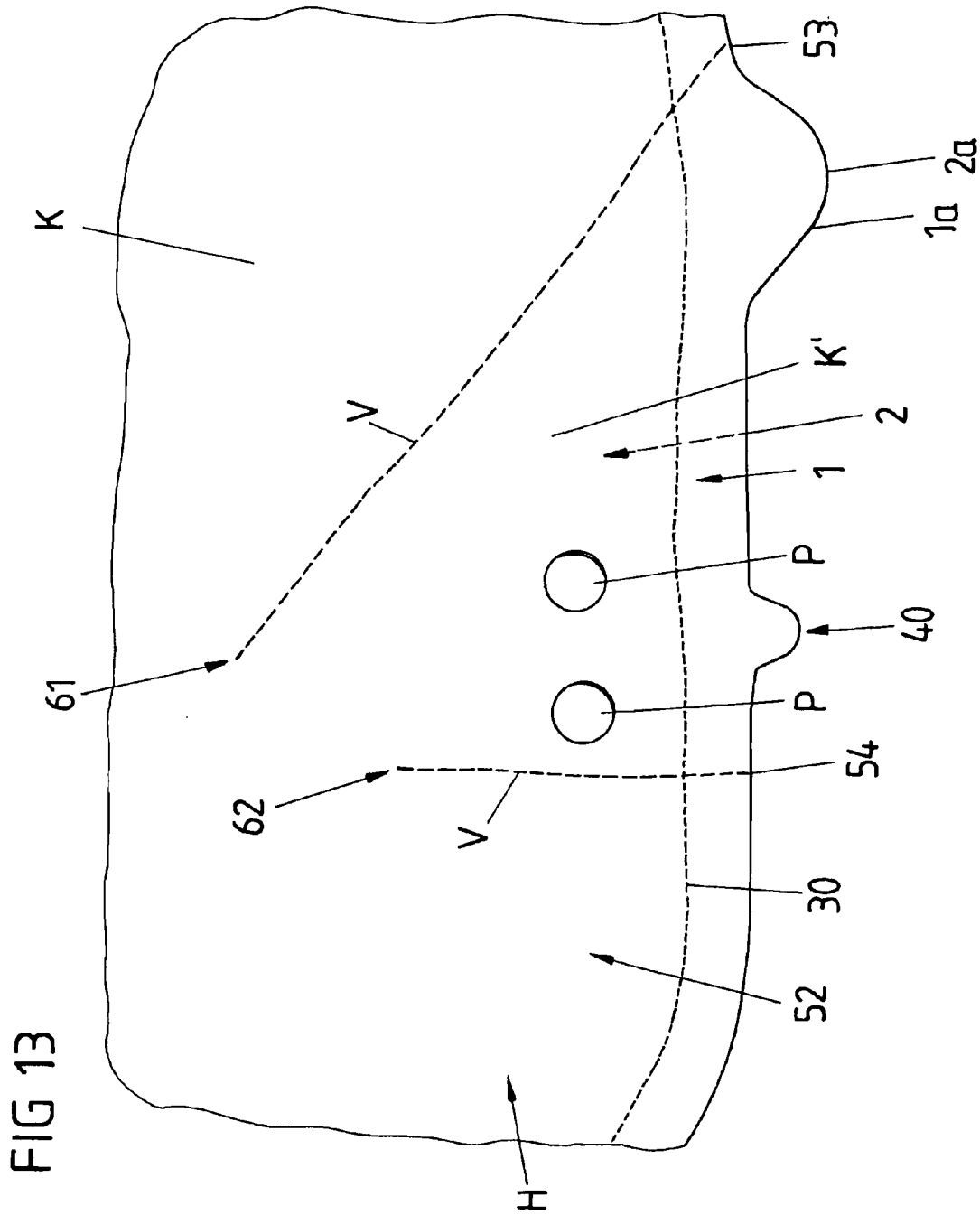
FIG. 13 shows a detail of the view shown in FIG. 12.

FIG. 10 shows in conjunction with the FIGS. 11 to 13 an airbag G of the kind shown in FIG. 6, in case of which at the thorax chamber 52, namely at the first airbag layer 1 adjacent to the outer edge 40 of the airbag covering H, two discharging openings O are formed that are covered by a covering element A of the kind shown in FIGS. 7 and 8.

At the second airbag layer 2 two discharging openings P are formed adjacent to each other, too, wherein in an evenly outspread state of the airbag covering H the two discharging openings O formed at the first airbag layer 1 are each aligned with respect to a discharge opening P formed at the second airbag layer 2.

The covering element A provided at the first airbag layer 1 serves on one hand for closing of the discharging opening O and on the other hand for protecting an occupant that faces the first airbag layer 1, in that gas escaping from the discharging openings O is redirected by means of the covering layer A, so that no hot gas stream flowing out of the airbag covering H hits the occupant. Since the second airbag layer 2 of the airbag covering H faces away from the occupant in case of retention, a covering element A arranged at the second airbag layer 2 for covering the discharging opening P formed thereabouts is not mandatory.

The discharging openings P provided at the second airbag layer 2 furthermore allows for a simple production of the airbag G, since hereby the first and second airbag layer 1, 2 may be formed as common parts.

Furthermore, the airbag G shown in FIGS. 10 to 13 comprises, as a difference to the airbag G shown in FIGS. 7 and 8, an additional tear seam V running along the edge 18 that encloses an acute angle with the tear seam V sewn over the covering layer A, so that a second chamber K' of the kind shown in FIG. 1 is formed that comprises the discharging openings O, P. As a difference to FIG. 1, the two tear seams V do not cross however, but form a gap between the free ends 61, 62 facing away from the edge 40, i.e., a discontinuation of the releasable connection between the two airbag layers 1, 2, through which already prior to tearing of the tear seams V gas set free in the first chamber K can escape into the second chamber K' and from there through the discharging openings O, P out of the airbag covering H.

Due to the tearing of the tear seams V as a consequence of the expansion of the airbag covering H upon inflation of the airbag G, the second chamber K' is completely opened on one hand, and on the other hand, the covering element A is set free, so that it is displaced into its curved second position by means of pressurizing it with outflowing gas. Hereby, the amount of gas that escapes per unit time from the discharging openings O, P is significantly increased.

The priority application, German Utility Model Application Number 20 2006 017 996.8, filed on Nov. 22, 2006, including the specification, drawings, claims and abstract, is incorporated herein by reference in its entirety.

The invention claimed is:

1. An airbag for a motor vehicle, comprising:
   an airbag covering, the airbag being configured to be filled with gas in order to protect a person, the airbag covering having first and second airbag layers facing each other, wherein a discharge opening is formed in one of the first and second airbag layers for discharging gas out of the airbag;
   a connecting element configured to form a releasable connection between the first and second airbag layers, wherein, upon inflation of the airbag, the releasable connection between the first and second airbag layers is configured to counter an escape of gas through the discharging opening, wherein, upon inflation of the airbag, the connecting element is configured to interact with the airbag covering such that the releasable connection between the first and second airbag layers is released and gas can escape out of the discharge opening, wherein the first and second airbag layers, upon inflation of the airbag, are configured to move away from each other such that a pre-definable force is introduced into the connecting element such that the releasable connection between the first and second airbag layers is released; and
   a covering element for covering the discharge opening,
   wherein the connecting element also is configured to form a releasable connection between the covering element and the first airbag layer such that the covering element butts against the discharging opening,
   wherein the connecting element is configured to set free the covering element upon inflation of the airbag for opening the discharging opening by releasing the releasable connection between the covering element and the first airbag layer so that gas can escape out of the discharging opening,
   wherein the releasable connection between the first and second airbag layers is formed by at least one tear seam connecting the first and second airbag layers,
   wherein the tear seam is configured to tear upon introduction of the pre-definable force so that the releasable connection between the first and second airbag layers is released, and
   wherein the connecting element connects the first and second airbag layers such that the first and second airbag layers form a first chamber and an adjacent second chamber of the airbag covering.

2. The airbag according to claim 1, wherein the airbag is adapted to be filled with gas via the first chamber.

3. The airbag according to claim 1, wherein the discharge opening is formed at the second chamber, wherein the releasable connection between the first and second airbag layers hinders or limits the escape of gas through the discharge opening.

4. The airbag according to claim 1, wherein the releasable connection between the first and second airbag layers comprises a discontinuation, such that prior to releasing of the releasable connection between the first and second airbag layers, gas can escape from the first chamber through the discharge opening via the second chamber.

5. The airbag according to claim 1, wherein the releasable connection between the first and second airbag layers is formed such that, after releasing of the releasable connection between the first and second airbag layers a significantly larger amount of gas escapes out of the discharge opening per unit time during inflation than prior to the releasing of the releasable connection between the first and second airbag layers.

6. The airbag according to claim 1, wherein the discharge opening is formed in the first airbag layer.

7. The airbag according to claim 1, wherein the covering element laminarly covers the discharging opening prior to inflation so that the covering element is pressurized with gas upon inflation of the airbag.

8. The airbag according to claim 1, wherein the covering element is adapted to redirect gas that is discharged out of the discharging opening.

9. The airbag according to claim 1, wherein the covering element is formed triangle-shaped.

10. The airbag according to claim 1, wherein the at least one tear seam is sewn over the covering element.

11. The airbag according to claim 1, wherein the covering element is formed from a flexible airbag fabric.

12. An airbag for a motor vehicle, comprising:
    an airbag covering, the airbag being configured to be filled with gas in order to protect a person, the airbag covering having first and second airbag layers facing each other, wherein a discharge opening is formed in one of the first and second airbag layers for discharging gas out of the airbag;
    a connecting element configured to form a releasable connection between the first and second airbag layers wherein, upon inflation of the airbag, the releasable connection between the first and second airbag layers is configured to counter an escape of gas through the discharging opening, wherein, upon inflation of the airbag, the connecting element is configured to interact with the airbag covering such that the releasable connection between the first and second airbag layers is released and gas can escape out of the discharge opening, wherein the first and second airbag layers, upon inflation of the airbag, are configured to move away from each other such that a pre-definable force is introduced into the connecting element such that the releasable connection between the first and second airbag layers is released; and
    a covering element for covering the discharge opening,
    wherein the connecting element also is configured to form a releasable connection between the covering element and the first airbag layer such that the covering element butts against the discharging opening,
    wherein the connecting element is configured to set free the covering element upon inflation of the airbag for opening the discharging opening by releasing the releasable connection between the covering element and the first airbag layer so that gas can escape out of the discharging opening,
    wherein the releasable connection between the first and second airbag layers is formed by at least one tear seam connecting the first and second airbag layers,
    wherein the tear seam is configured to tear upon introduction of the pre-definable force so that the releasable connection between the first and second airbag layers is released,
    wherein the at least one tear seam comprises two tear seams running at an acute angle with respect to each other, each tear seam extending from an outer edge of the airbag covering.

13. An airbag for a motor vehicle, comprising:
    an airbag covering, the airbag being configured to be filled with as in order to protect a person, the airbag covering having first and second airbag layers facing each other, wherein a discharge opening is formed in one of the first and second airbag layers for discharging gas out of the airbag;

a connecting element configured to form a releasable connection between the first and second airbag layers, wherein, upon inflation of the airbag, the releasable connection between the first and second airbag layers is configured to counter an escape of gas through the discharging opening, wherein, upon inflation of the airbag, the connecting element is configured to interact with the airbag covering such that the releasable connection between the first and second airbag layers is released and gas can escape out of the discharge opening, wherein the first and second airbag layers, upon inflation of the airbag, are configured to move away from each other such that a pre-definable force is introduced into the connecting element such that the releasable connection between the first and second airbag layers is released; and a covering element for covering the discharge opening, wherein the connecting element also is configured to form a releasable connection between the covering element and the first airbag layer such that the covering element butts against the discharging opening, wherein the connecting element is configured to set free the covering element upon inflation of the airbag for opening the discharging opening by releasing the releasable connection between the covering element and the first airbag layer so that gas can escape out of the discharging opening, wherein the releasable connection between the first and second airbag layers is formed by at least one tear seam connecting the first and second airbag layers, wherein the tear seam is configured to tear upon introduction of pre-definable force so that the releasable connection between the first and second airbag layers is released, and wherein the covering element is adapted to be displaced from a first position, in which the covering element closes the discharging opening, into a second position, in which the covering element is arranged with respect to the discharging opening such that gas can escape out of the airbag through the discharging opening, by pressurizing the covering element with gas after the releasing of the covering element.

14. The airbag according to claim 13, wherein in the first position the covering element butts with a first area against an edge area of the discharging opening that limits the discharging opening.

15. The airbag according to claim 13, wherein in the second position the covering element comprises a bulge such that a first area of the covering element is arranged in front of the discharging opening at a distance to the discharging opening.

16. The airbag according to claim 15, wherein in the first position the covering element comprises a crease for forming the bulge.

17. The airbag according to claim 16, wherein in the first position the crease divides the covering element into the first area and a second area connected to the first area.

18. The airbag according to claim 17, wherein in the first position of the covering element prior to the releasing of the covering element the crease is fixed to the first airbag layer by the connecting element such that the first area tightly butts against an edge area of the discharging opening, wherein the second area is arranged between the first area and the first airbag layer.

19. An airbag for a motor vehicle, comprising:

an airbag covering, the airbag being configured to be filled with gas in order to protect a person, the airbag covering having first and second airbag layers facing each other, wherein a first discharge opening is formed in the first airbag layer for discharging gas out of the airbag;

a connecting element configured to form a releasable connection between the first and second airbag layers wherein, upon inflation of the airbag, the releasable connection between the first and second airbag layers is configured to counter an escape of gas through the first discharging opening, wherein, upon inflation of the airbag, the connecting element is configured to interact with the airbag covering such that the releasable connection between the first and second airbag layers is released and gas can escape out of the first discharge opening, wherein the first and second airbag layers, upon inflation of the airbag, are configured to move away from each other such that a pre-definable force is introduced into the connecting element such that the releasable connection between the first and second airbag layers is released; and a covering element for covering the first discharge opening, wherein the connecting element also is configured to form a releasable connection between the covering element and the first airbag layer such that the covering element butts against the first discharging opening, wherein the connecting element is configured to set free the covering element upon inflation of the airbag for opening the first discharging opening releasing the releasable connection between the covering element and the first airbag layer so that gas can escape out of the first discharging opening, wherein the releasable connection between the first and second airbag layers is formed by at least one tear seam connecting the first and second airbag layers, wherein the tear seam is configured to tear upon introduction of the pre-definable force so that the releasable connection between the first and second airbag layers is released, and wherein a second discharging opening is formed in the second airbag layer that, related to an evenly outspread state of the first and second airbag layers, aligns with the first discharging opening provided in the first airbag layer.

* * * * *